J. H. Shrote,
Cake Cutter,
Nº 25,767.                    Patented Oct. 11, 1859.
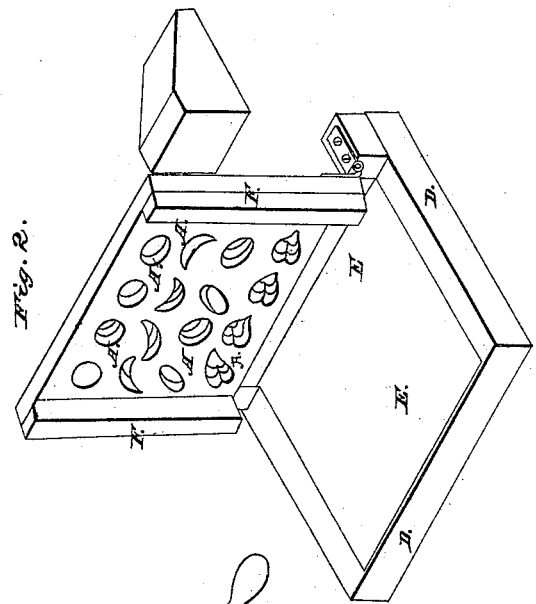
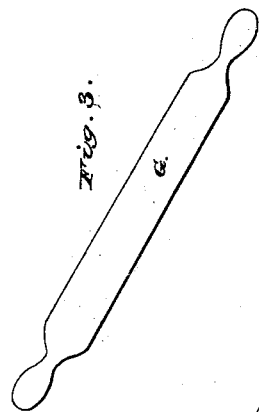
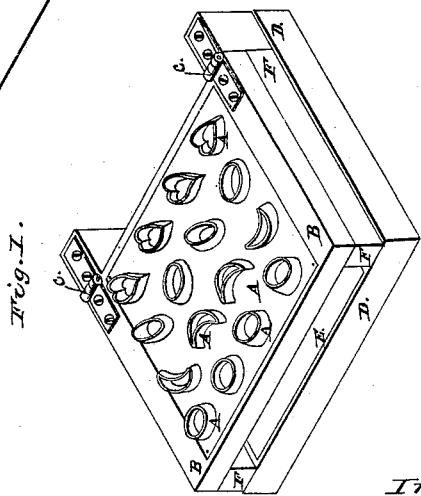
Witnesses:
Jos. C. Clayton
J. G. Clayton
Inventor.
John H. Shrote.

UNITED STATES PATENT OFFICE.

JOHN H. SHROTE, OF BALTIMORE, MARYLAND.

CUTTING AND PANNING CAKES.

Specification of Letters Patent No. 25,767, dated October 11, 1859.

*To all whom it may concern:*

Be it known that I, JOHN H. SHROTE, of the city and county of Baltimore and State of Maryland, have invented new and useful Improvements in Cake-Cutters; and I do hereby declare that the following is a full and exact description thereof, reference being had to the accompanying drawings and to the letters of reference marked thereon, in which—

Figure 1 is a perspective view of the invention ready to cut the dough into cakes and to deliver the cakes on the pan for baking. Fig. 2 is a perspective view with the cutter board elevated in the act of discharging the scraps left on it after cutting out the cakes and depositing them on the pan. Fig. 3 is a view of the pin for rolling over the dough to cut the cakes.

The nature of my invention consists in the manner of combining my improvement in cutters with the baking pans, as hereinafter described.

To enable others skilled to make and use my invention I will describe its construction and operation.

In the construction of my invention, in Figure 1 A is the cutters which may be made of any shape or varieties of shapes desired to be given to the cakes cut. These are made by forming a piece of tin of the shape desired and then cutting the shape out of a piece or sheet of tin and soldering the said pieces on to the sheet of tin so that when thus soldered the whole sheet with the cutters on it is in one continuous piece. B, is a piece of wood or board with corresponding holes cut through it, onto which the cutters A are firmly attached, so that the whole is made a firm bun or cake cutter.

C is the hinges for swinging the cutter back and forth as may be required.

D is the bottom board, on which is set the cake pan E, for receiving the cakes as they fall through the cutters A.

F, are ledges attached to board B, for giving the required distance between the cutters A and pan E.

I may find it more convenient to make the whole cutters out of cast metal, or of strong sheet metal, so that I may in either of such cases dispense with the board B, as now represented, as in the use of cast or stiff sheet metal it will not be wanted.

In Fig. 2 the same letters designate like parts. In Fig. 3, G is the roller.

In the operation of my invention, the cake cutter is placed as seen in Fig. 1. The dough is then rolled on the board to the thickness required. It is then placed on the cutter A and the roller G, is passed over it sufficiently hard to cut the cakes, which fall at once down on the pan E in proper position to be placed in the oven for baking, and is removed away and put in the oven. Then the cutters A are raised up and turned on the hinges and allowed to fall back, thus relieving it of all the scraps of dough which were left after cutting out the cakes, when it is again ready to renew, as described, the operation of cutting. If the cakes or any of them stick to the cutter in passing through, it is only necessary to lift up the cutter board and let it fall down once or twice on the bottom board, which will cause the cakes to fall out on to the pan E. The cutters are made about an eighth of an inch smaller at the top than at the bottom to give greater facility for discharging the cakes as they are cut.

Having thus fully described the nature of my invention, what I claim as new and desire to secure by Letters Patent is—

The cutters A as constructed or its equivalent, in combination with the pan E and bottom board D, for the purposes of facilitating the cutting and removing the cakes to the oven, as set forth, and described.

JOHN H. SHROTE.

Witnesses:
Jos. C. CLAYTON,
T. G. CLAYTON.